US012741980B2

(12) United States Patent
Zhou et al.

(10) Patent No.: US 12,741,980 B2
(45) Date of Patent: Sep. 22, 2026

(54) METHOD FOR PREPARING 4-(HYDROXYMETHYLPHOSPHINYL)-2-OXOBUTANOIC ACID

(71) Applicants: ZHEJIANG WYNCA CHEMICAL INDUSTRY GROUP CO., LTD, Hangzhou (CN); ZHEJIANG UNIVERSITY, Hangzhou (CN)

(72) Inventors: Shuguang Zhou, Hangzhou (CN); Lirong Yang, Hangzhou (CN); Long Qin, Hangzhou (CN); Haisheng Zhou, Hangzhou (CN); Shenluan Yu, Hangzhou (CN); Jianping Wu, Hangzhou (CN); Linlin Wang, Hangzhou (CN); Bo Zhan, Hangzhou (CN); Ping Wang, Hangzhou (CN)

(73) Assignees: ZHEJIANG WYNCA CHEMICAL INDUSTRY GROUP CO., LTD, Hangzhou (CN); ZHEJIANG UNIVERSITY, Hangzhou (CN)

( * ) Notice: Subject to any disclaimer, the term of this patent is extended or adjusted under 35 U.S.C. 154(b) by 430 days.

(21) Appl. No.: 18/562,309

(22) PCT Filed: Mar. 6, 2023

(86) PCT No.: PCT/CN2023/079814

§ 371 (c)(1),
(2) Date: Nov. 18, 2023

(87) PCT Pub. No.: WO2024/051120

PCT Pub. Date: Mar. 14, 2024

(65) Prior Publication Data

US 2025/0084110 A1 Mar. 13, 2025

(30) Foreign Application Priority Data

Sep. 8, 2022 (CN) ........................ 202211096101.4

(51) Int. Cl.
*C07F 9/30* (2006.01)

(52) U.S. Cl.
CPC .................................... *C07F 9/301* (2013.01)

(58) Field of Classification Search
CPC .... C07F 9/301; C07F 9/30; C07F 9/32; C07F 9/3211; C07F 9/3264; C07C 253/14; C07C 255/17
See application file for complete search history.

(56) References Cited

U.S. PATENT DOCUMENTS

| | | | |
|---|---|---|---|
| 4,399,287 | A | 8/1983 | Baillie et al. |
| 4,470,842 | A | 9/1984 | Robert et al. |
| 2009/0270351 | A1 | 10/2009 | Witter et al. |
| 2010/0063313 | A1 | 3/2010 | Minowa et al. |
| 2017/0081349 | A1 | 3/2017 | Ressel et al. |

FOREIGN PATENT DOCUMENTS

| | | | |
|---|---|---|---|
| CN | 101641363 | A | 2/2010 |
| CN | 103665032 | A | 3/2014 |
| CN | 106459110 | A | 2/2017 |
| CN | 111004277 | A | 4/2020 |
| CN | 114085244 | A | 2/2022 |
| SU | 1583424 | A1 | 8/1990 |

OTHER PUBLICATIONS

International Search Report for PCT/CN2023/079814 mailed Apr. 23, 2023, ISA/CN.

Zeiss Hans-Joachim, Enantioselective Synthesis of Both Enantiomers of Phosphinothricin via Asymmetric Hydrogenation of α-Acylamido Acrylates, The Journal of Organic Chemistry, Mar. 1, 1991, 56, p. 1783-1788.

Chinese First Office Action issued on Apr. 14, 2026 for Chinese priority application No. 202211096101.4.

Jorge Ballester et al.: "A Copper-Catalyzed Variant of the Michaelis-Arbuzov Reaction", «ChemCatChem», vol. 6, Issue 6, Apr. 10, 2014, 1549 - 1552.

*Primary Examiner* — Jafar F Parsa

(74) *Attorney, Agent, or Firm* — Yue (Robert) Xu; Apex Attorneys at Law, LLP

(57) ABSTRACT

A method for preparing 4-(hydroxymethylphosphinyl)-2-oxobutanoic acid, comprising the following steps: a) mixing 3-chloropropionyl chloride, a first solvent, trimethylsilyl cyanide and cyanide salt, performing a substitution reaction to obtain a material solution containing 4-chloro-2-oxobutyronitrile, then performing distillation under reduced pressure, and performing separation to obtain 4-chloro-2-oxobutyronitrile intermediate; b) subjecting the 4-chloro-2-oxobutyronitrile intermediate obtained in step a) and methyl phosphonite diester to Arbuzov reaction in a second solvent in the presence of cuprous iodide to obtain a material solution of (3-cyano-3-oxopropyl) methyl phosphinate, and performing purification to obtain crude (3-cyano-3-oxopropyl) methyl phosphinate; c) mixing the obtained crude (3-cyano-3-oxopropyl)methyl phosphinate with hydrochloric acid, performing hydrolysis reaction, and then performing purification treatment to obtain 4-(hydroxymethylphosphinyl)-2-oxobutanoic acid. This preparation method can prepare 4-(hydroxymethylphosphinyl)-2-oxobutanoic acid with high yield, and the reaction conditions are mild, the operation is simple, the production cost is low, and it is easy to realize industrialization.

10 Claims, 2 Drawing Sheets

Signal: FID1A

| Retention time [min] | Type | Peak width[min] | Peak area | Height | Peak area% |
|---|---|---|---|---|---|
| 2.429 | BB | 0.24 | 211.74 | 198.18 | 1.97 |
| 3.040 | BV | 0.05 | 3.42 | 2.60 | 0.03 |
| 3.138 | VV | 0.39 | 10239.51 | 4566.95 | 95.07 |
| 4.067 | BV | 0.25 | 12.01 | 3.86 | 0.11 |
| 8.087 | BV | 0.38 | 304.30 | 146.76 | 2.83 |
| | | Total | 10770.98 | | |

METHOD FOR PREPARING 4-(HYDROXYMETHYLPHOSPHINYL)-2-OXOBUTANOIC ACID

CROSS REFERENCE TO RELATED APPLICATIONS

This application is the national phase of International Application No. PCT/CN2023/079814, titled "METHOD FOR PREPARING 4-(HYDROXYMETHYLPHOSPHINYL)-2-OXOBUTANOIC ACID", filed on Mar. 6, 2023, which claims the priority to Chinese Patent Application No. 202211096101.4, titled "METHOD FOR PREPARING 4-(HYDROXYMETHYLPHOSPHINYL)-2-OXOBUTANOIC ACID", filed on Sep. 8, 2022, with the China National Intellectual Property Administration, which are incorporated herein by reference in entirety.

FIELD

The present invention relates to the technical field of fine chemicals, in particular to a method for preparing a pesticide intermediate 4-(hydroxymethylphosphinyl)-2-oxobutanoic acid.

BACKGROUND 4-(Hydroxymethylphosphinyl)-2-oxobutanoic acid, abbreviated as PPO or ketoacid, is an important intermediate in the synthesis process of glufosinate-ammonium. This compound can be subjected to steps such as ammoniation reduction to obtain glufosinate-ammonium, which can be bio-enzymatically converted into L-glufosinate-ammonium.

In 1980, FBC Company first applied for the U.S. Pat. No. 4,399,287A for the preparation of ketoacid intermediate, wherein the carbon chain of 3-(ethoxymethylphosphinyl) propanoate is extended through Claisen condensation reaction to obtain a ketoacid intermediate 4-(hydroxymethylphosphinyl)-2-oxobutanoic acid, where the isolated yield of 4-(hydroxymethylphosphinyl)-2-oxobutanoic acid is about 30%.

In 1991, Hoechst Company reported the chemical synthesis of 4-(hydroxymethylphosphinyl)-2-oxobutanoic acid (J. Org. Chem., 1991, 56, 1783-1788), wherein monoethyl methylphosphonite and ethyl acrylate are subjected to Michael addition reaction under the action of sodium ethoxide to obtain ethyl 3-(ethoxymethylphosphinyl)propanoate, which is then subjected to Claisen ester condensation reaction with diethyl oxalate under the action of sodium ethoxide at −50 °C, and then hydrolysis and decarboxylation are performed with hydrochloric acid to prepare 4-(hydroxymethylphosphinyl)-2-oxobutanoic acid. However, the reaction in this method needs to be performed at −50 °C, the overall yield is low, a large amount of waste water is generated, and the duration of the crystallization of the product is as long as 48 hours. The reaction formula is as follows:

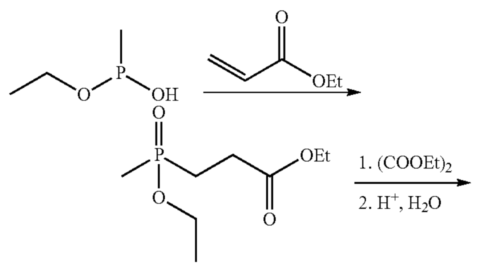

-continued

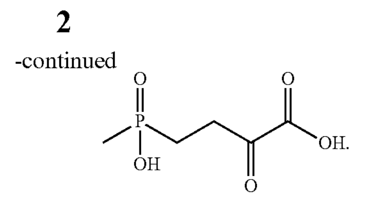

In addition, the Chinese patent with publication number CN101641363A discloses a method for preparing α-keto acid containing phosphorus, comprising subjecting 3-(hydroxyl (methyl)phosphinyl)-propionic acid as a raw material to esterification with alcohol under acidic conditions to obtain 3-(hydroxyl(methyl)phosphinyl)-propionate, further performing reaction with oxalic acid diester in the presence of sodium alkoxide to obtain a condensation product, and further performing hydrolysis to obtain a ketoacid product, with a total yield of about 50%.

Therefore, providing a method for preparing 4-(hydroxymethylphosphinyl)-2-oxobutanoic acid with high yield, simple purification and readily available raw materials has become a technical problem to be solved urgently by those skilled in the art.

SUMMARY

In view of this, an object of the present invention is to provide a method for preparing 4-(hydroxymethylphosphinyl)-2-oxobutanoic acid. This preparation method can prepare a final product 4-(hydroxymethylphosphinyl)-2-oxobutanoic acid with high yield, and the reaction conditions are mild, the operation is simple, the production cost is low, and it is easy to realize industrialization.

The present invention provides a method for preparing 4-(hydroxymethylphosphinyl)-2-oxobutanoic acid, comprising the following steps:

a) mixing 3-chloropropionyl chloride, a first solvent, trimethylsilyl cyanide and cyanide salt, performing a substitution reaction to obtain a material solution containing 4-chloro-2-oxobutyronitrile, then performing distillation under reduced pressure, and performing separation to obtain 4-chloro-2-oxobutyronitrile intermediate;

b) subjecting the 4-chloro-2-oxobutyronitrile intermediate obtained in step a) and methyl phosphonite diester to Arbuzov reaction in a second solvent in the presence of cuprous iodide to obtain a material solution of (3-cyano-3-oxopropyl) methyl phosphinate, and performing purification to obtain crude (3-cyano-3-oxopropyl) methyl phosphinate;

c) mixing the crude (3-cyano-3-oxopropyl)methyl phosphinate obtained in step b) with hydrochloric acid, performing hydrolysis reaction, and then performing purification treatment to obtain 4-(hydroxymethylphosphinyl)-2-oxobutanoic acid.

Preferably, in step a), the first solvent is selected from the group consisting of acetonitrile, toluene, 2-methyltetrahydrofuran, phenylacetonitrile and a combination thereof;

the cyanide salt is selected from the group consisting of sodium cyanide, potassium cyanide, cuprous cyanide and a combination thereof;

the trimethylsilyl cyanide, cyanide salt and 3-chloropropionyl chloride are in a molar ratio of (0.005-0.2):(0.8-3):1.

Preferably, in step a), the substitution reaction is performed at a temperature of 0 °C-150 °C for 0.5 h-48 h.

Preferably, in step b), the methyl phosphonite diester is selected from the group consisting of dimethyl methylphosphonite, diethyl methylphosphonite, dipropyl methylphosphonite, dibutyl methylphosphonite, and a combination thereof;

the methylphosphonite diester and the 4-chloro-2-oxobutyronitrile intermediate are in a molar ratio of (0.8-10):1.

Preferably, in step b), the cuprous iodide and 4-chloro-2-oxobutyronitrile intermediate are in a molar ratio of (0.005-0.2):1.

Preferably, in step b), the second solvent is selected from the group consisting of 1,2-dichloroethane, 2-methyltetrahydrofuran, benzene, toluene, xylene and a combination thereof;

the second solvent and the 4-chloro-2-oxobutyronitrile intermediate are in a mass ratio of (1-10):1.

Preferably, in step b), the Arbuzov reaction is conducted at a temperature of 50 °C-150 °C for 1 h to 24 h.

Preferably, in step c), the hydrochloric acid has a mass concentration of 20%-36%;

the hydrochloric acid and the 4-chloro-2-oxobutyronitrile intermediate in step b) are in a molar ratio of (1-15):1.

Preferably, in step c), the hydrolysis reaction is conducted at a temperature of 50 °C-130 °C for 1 h-24 h.

Preferably, in step c), the process of the purification treatment is specifically conducted by:

removing acid water from the product obtained by the hydrolysis reaction under reduced pressure to obtain a mixture containing 4-(hydroxymethylphosphinyl)-2-oxobutanoic acid and inorganic salts, then adding acetone for dissolution, performing filtration to remove insoluble salts, concentrating the filtrate under reduced pressure to half of the volume, and adding methyl isobutyl ketone for crystallization to obtain the product 4-(hydroxymethylphosphinyl)-2-oxobutanoic acid.

The present invention provides a method for preparing 4-(hydroxymethylphosphinyl)-2-oxobutanoic acid, comprising the following steps: a) mixing 3-chloropropionyl chloride, a first solvent, trimethylsilyl cyanide and cyanide salt, performing a substitution reaction to obtain a material solution containing 4-chloro-2-oxobutyronitrile, then performing distillation under reduced pressure, and performing separation to obtain 4-chloro-2-oxobutyronitrile intermediate; b) subjecting the 4-chloro-2-oxobutyronitrile intermediate obtained in step a) and methyl phosphonite diester to Arbuzov reaction in a second solvent in the presence of cuprous iodide to obtain a material solution of (3-cyano-3-oxopropyl)methyl phosphinate, and performing purification to obtain crude (3-cyano-3-oxopropyl)methyl phosphinate; c) mixing the crude (3-cyano-3-oxopropyl)methyl phosphinate obtained in step b) with hydrochloric acid, performing hydrolysis reaction, and then performing purification treatment to obtain 4-(hydroxymethylphosphinyl)-2-oxobutanoic acid. Compared with the prior art, the preparation method provided by the present invention obtains the final product 4-(hydroxymethylphosphinyl)-2-oxobutanoic acid in a high yield by using 3-chloropropionyl chloride as a raw material through several simple steps such as substitution reaction, Arbuzov reaction, and hydrolysis reaction. The reaction conditions are mild, the operation is simple, the production cost is low, and it is easy to realize industrialization.

DETAILED DESCRIPTION

Figure 1:
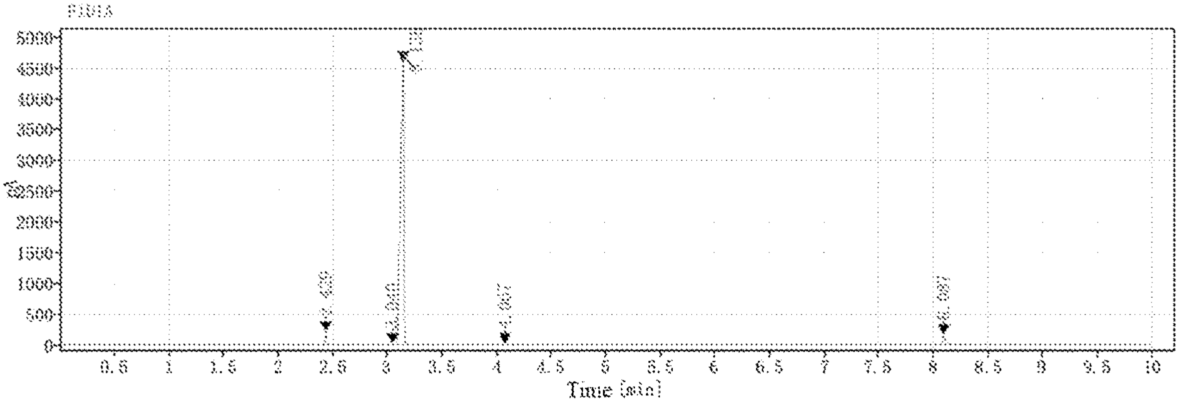
FIG. 1 is the GC spectrogram of the 4-chloro-2-oxobutyronitrile obtained in Example 1 of the present invention.

The technical solutions of the present invention will be clearly and completely described below in conjunction with the examples of the present invention. Apparently, the described examples are only some of the embodiments of the present invention, not all of them. Based on the embodiments of the present invention, all other embodiments obtained by those of ordinary skill in the art without making creative efforts belong to the protection scope of the present invention.

The present invention provides a method for preparing 4-(hydroxymethylphosphinyl)-2-oxobutanoic acid, comprising the following steps:

a) mixing 3-chloropropionyl chloride, a first solvent, trimethylsilyl cyanide and cyanide salt, performing a substitution reaction to obtain a material solution containing 4-chloro-2-oxobutyronitrile, then performing distillation under reduced pressure, and performing separation to obtain 4-chloro-2-oxobutyronitrile intermediate;

b) subjecting the 4-chloro-2-oxobutyronitrile intermediate obtained in step a) and methyl phosphonite diester to Arbuzov reaction in a second solvent in the presence of cuprous iodide to obtain a material solution of (3-cyano-3-oxopropyl)methyl phosphinate, and performing purification to obtain crude (3-cyano-3-oxopropyl)methyl phosphinate;

c) mixing the crude (3-cyano-3-oxopropyl)methyl phosphinate obtained in step b) with hydrochloric acid, performing hydrolysis reaction, and then performing purification treatment to obtain 4-(hydroxymethylphosphinyl)-2-oxobutanoic acid.

The present invention provides a method for preparing 4-(hydroxymethylphosphinyl)-2-oxobutanoic acid, wherein 3-chloropropionyl chloride (represented by formula I below), as a raw material, was subjected to a substitution reaction with cyanide salt in the presence of trimethylsilyl cyanide to obtain 4-chloro-2-oxobutyronitrile (represented by formula II below), which is then subjected to Arbuzov reaction with methylphosphonite diester to obtain (3-cyano-3-oxopropyl)methyl phosphinate (represented by formula III below), and (3-cyano-3-oxopropyl)methyl phosphinate (represented by formula III below) is further hydrolyzed and separated to obtain the target product 4-(hydroxymethylphosphinyl)-2-oxobutanoic acid (represented by formula IV below). The present invention adopts the method of directly performing an Arbuzov reaction of 4-chloro-2-oxobutyronitrile as a raw material and methylphosphonite diester. The overall process route is shorter, and can still maintain a high yield;

I

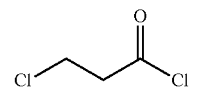

II

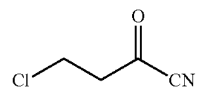

-continued

III

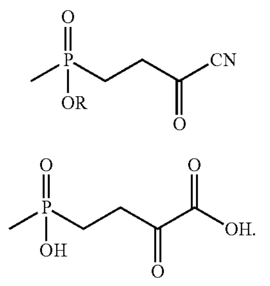

IV

The reaction formula of the method for preparing 4-(hydroxymethylphosphinyl)-2-oxobutanoic acid provided by the present invention is as follows:

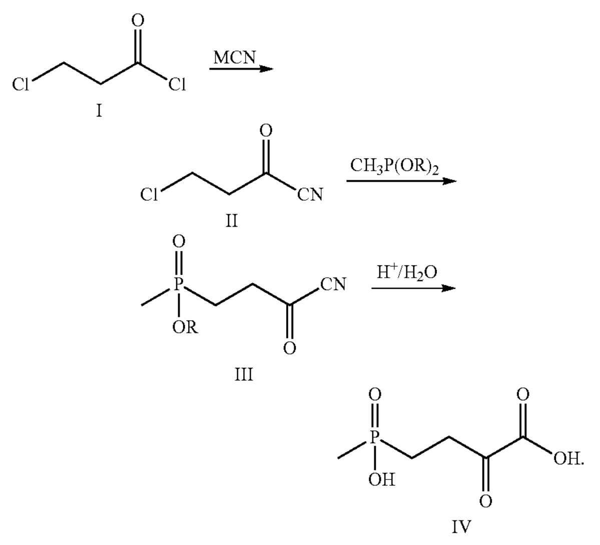

I, II, III, IV

In the present invention, firstly, 3-chloropropionyl chloride, a first solvent, trimethylsilyl cyanide and cyanide salt are mixed, and a substitution reaction is carried out to obtain a material solution containing 4-chloro-2-oxobutyronitrile, which is then distilled under reduced pressure, and separated to obtain 4-chloro-2-oxobutyronitrile intermediate. In the present invention, there is no special limitation on the sources of the 3-chloropropionyl chloride, the first solvent, trimethylsilyl cyanide and cyanide salt, and commercially available products well known to those skilled in the art can be used.

In the present invention, the first solvent is preferably selected from the group consisting of acetonitrile, toluene, 2-methyltetrahydrofuran, phenylacetonitrile and a combination thereof, more preferably acetonitrile or toluene.

In the present invention, the cyanide salt is preferably selected from the group consisting of sodium cyanide, potassium cyanide, cuprous cyanide and a combination thereof.

In the present invention, the trimethylsilyl cyanide, cyanide salt and 3-chloropropionyl chloride are in a molar ratio of preferably (0.005-0.2):(0.8-3): 1, more preferably (0.01-0.05):(1-1.2):1.

In the present invention, the process of mixing 3-chloropropionyl chloride, the first solvent, trimethylsilyl cyanide and cyanide salt is preferably specifically conducted by:

adding 3-chloropropionyl chloride in the first solvent, and then adding trimethylsilyl cyanide as catalyst and cyanide salt, and stirring the mixture evenly.

In the present invention, the substitution reaction is preferably performed at a temperature of 0 °C-150 °C, more preferably 70 °C-110 °C, for preferably 0.5 h-48 h, more preferably 3 h-10 h. On this basis, i.e., after being heated to react for a period of time, the mixture was cooled to obtain a material solution containing 4-chloro-2-oxobutyronitrile.

In the present invention, the distillation under reduced pressure is conducted at a temperature of preferably 50 °C-150 °C, more preferably 80 °C-100 °C In the present invention, after obtaining the 4-chloro-2-oxobutyronitrile intermediate, the obtained 4-chloro-2-oxobutyronitrile intermediate and methylphosphonite diester are subjected to Arbuzov reaction in a second solvent in the presence of cuprous iodide to obtain a material solution of (3-cyano-3-oxopropyl)methyl phosphinate, which is purified to obtain crude (3-cyano-3-oxopropyl) methyl phosphinate.

In the present invention, the methylphosphonite diester is preferably selected from the group consisting of dimethyl methylphosphonite, diethyl methylphosphonite, dipropyl methylphosphonite, dibutyl methylphosphonite, and a combination thereof; the cuprous iodide mainly plays a catalytic role. In the present invention, there is no special limitation on the sources of the methylphosphonite diester and cuprous iodide, and commercially available products well known to those skilled in the art can be used.

In the present invention, the methylphosphonite diester and the 4-chloro-2-oxobutyronitrile intermediate are in a molar ratio of preferably (0.8-10):1, more preferably (1-5):1.

In the present invention, the cuprous iodide and 4-chloro-2-oxobutyronitrile intermediate are in a molar ratio of preferably (0.005-0.2):1, more preferably (0.02-0.05):1.

In the present invention, the second solvent is preferably selected from the group consisting of 1,2-dichloroethane, 2-methyltetrahydrofuran, benzene, toluene, xylene and a combination thereof, more preferably 1,2-dichloroethane or 2-methyltetrahydrofuran; excess methylphosphonite diester can also be directly added as the second solvent. In the present invention, there is no special limitation on the source of the second solvent, and commercially available products well known to those skilled in the art can be used.

In the present invention, the second solvent and the 4-chloro-2-oxobutyronitrile intermediate are in a mass ratio of preferably (1-10):1, more preferably (2-5):1.

In the present invention, the Arbuzov reaction is conducted at a temperature of preferably 50 °C-150 °C, more preferably 80 °C-120 °C, for preferably 1 h-24 h, more preferably 5 h-10 h.

In the present invention, the purification process is preferably specifically conducted by:

removing the second solvent, by-products and unreacted raw materials from the material solution of (3-cyano-3-oxopropyl) methyl phosphinate obtained by the Arbuzov reaction under reduced pressure, to obtain crude (3-cyano-3-oxopropyl)methyl phosphinate.

In the present invention, after obtaining the crude (3-cyano-3-oxopropyl)methyl phosphinate, the obtained crude (3-cyano-3-oxopropyl)methyl phosphinate is mixed with hydrochloric acid to undergo hydrolysis reaction, and then purification is performed to obtain 4-(hydroxymethylphosphinyl)-2-oxobutanoic acid.

In the present invention, the hydrochloric acid has a mass concentration of preferably 20%-36%. In the present invention, there is no special limitation on the source of the hydrochloric acid, and commercially available products well known to those skilled in the art can be used.

In the present invention, the hydrochloric acid and the 4-chloro-2-oxobutyronitrile intermediate in step b) are in a molar ratio of preferably (1-15):1, more preferably (2-5):1.

In the present invention, the hydrolysis reaction is conducted at a temperature of preferably 50 °C-130 °C, more preferably 80 °C-110 °C, for preferably 1 h-24 h, more preferably 3 h-10 h.

In the present invention, the process of the purification treatment is preferably specifically conducted by:

removing acid water from the product obtained by the hydrolysis reaction to obtain a mixture containing 4-(hydroxymethylphosphinyl)-2-oxobutanoic acid and inorganic salts, then adding acetone for dissolution, performing filtration to remove insoluble salts, concentrating the filtrate under reduced pressure to half of the volume, and adding methyl isobutyl ketone for crystallization to obtain the product 4-(hydroxymethylphosphinyl)-2-oxobutanoic acid.

The present invention provides a method for preparing 4-(hydroxymethylphosphinyl)-2-oxobutanoic acid, comprising the following steps: a) mixing 3-chloropropionyl chloride, a first solvent, trimethylsilyl cyanide and cyanide salt, performing a substitution reaction to obtain a material solution containing 4-chloro-2-oxobutyronitrile, then performing distillation under reduced pressure, and performing separation to obtain 4-chloro-2-oxobutyronitrile intermediate; b) subjecting the 4-chloro-2-oxobutyronitrile intermediate obtained in step a) and methyl phosphonite diester to Arbuzov reaction in a second solvent in the presence of cuprous iodide to obtain a material solution of (3-cyano-3-oxopropyl) methyl phosphinate, and performing purification to obtain crude (3-cyano-3-oxopropyl) methyl phosphinate; c) mixing the crude (3-cyano-3-oxopropyl)methyl phosphinate obtained in step b) with hydrochloric acid, performing hydrolysis reaction, and then performing purification treatment to obtain 4-(hydroxymethylphosphinyl)-2-oxobutanoic acid. Compared with the prior art, the preparation method provided by the present invention obtains the final product 4-(hydroxymethylphosphinyl)-2-oxobutanoic acid in high yield by using 3-chloropropionyl chloride as a raw material through several simple steps such as substitution reaction, Arbuzov reaction, and hydrolysis reaction. The reaction conditions are mild, the operation is simple, the production cost is low, and it is easy to realize industrialization.

In order to further illustrate the present invention, the present invention will be described in detail below in conjunction with the following examples. The raw materials used in the following examples of the present invention are all commercially available products.

Example 1

(1) 130 g of 98% 3-chloropropionyl chloride, 300 mL of acetonitrile, 2.1 g of 96% trimethylsilyl cyanide and 52.5 g of 98% sodium cyanide were added into a 1000 mL four-neck flask. The mixture was heated up to 70-80 °C, and maintained at this temperature for 8 h of reaction. Then the mixture was cooled down to obtain a material solution containing 4-chloro-2-oxobutyronitrile. The solution was distilled under reduced pressure at a temperature controlled at 90-100 °C, and separated to obtain 109.0 g of 95% 4-chloro-2-oxobutyronitrile (see FIG. 1 for GC spectrogram) with a yield of 89%.

(2) The 4-chloro-2-oxobutyronitrile obtained in step (1) and 130 g of 98% diethyl methylphosphonite were added into 500 mL of 1,2-dichloroethane, and added with 3.4 g of cuprous iodide as a catalyst. The mixture was stirred at 80-90 °C for 8 hours of reaction to obtain a material solution of ethyl (3-cyano-3-oxopropyl)methyl phosphinate. The solvent, by-products and unreacted raw materials were removed under reduced pressure to obtain crude ethyl (3-cyano-3-oxopropyl)methyl phosphinate.

Figure 2:
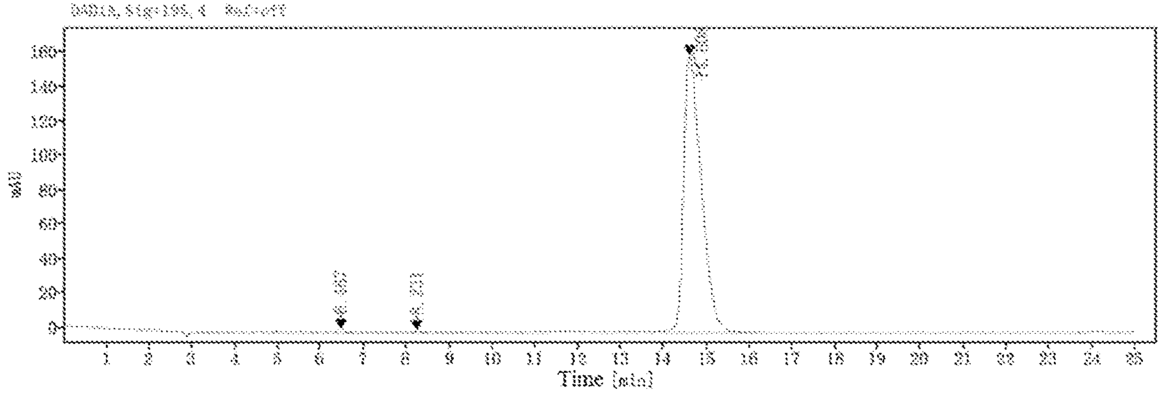
FIG. 2 is the HPLC spectrogram of the 4-(hydroxymethylphosphinyl)-2-oxobutanoic acid obtained in Example 1 of the present invention.

(3) The crude ethyl (3-cyano-3-oxopropyl)methyl phosphinate obtained in step (2) was added into a 1000 mL four-necked flask filled with 320 g of 30% hydrochloric acid. The mixture was heated to 90-100 °C to perform hydrolysis reaction. After 6 h, the acid water was removed under reduced pressure to obtain a mixture containing 4-(hydroxymethylphosphinyl)-2-oxobutanoic acid and inorganic salts, which was added with 300 mL of acetone for dissolution. The mixture was filtered to remove insoluble salts, and the filtrate was concentrated under reduced pressure to half the volume. 500 mL of methyl isobutyl ketone was added for crystallization to obtain 113.5 g of 4-(hydroxymethylphosphinyl)-2-oxobutanoic acid (see FIG. 2 for HPLC spectrum), with a purity of 96% and a yield of 68%.

Figure 3:
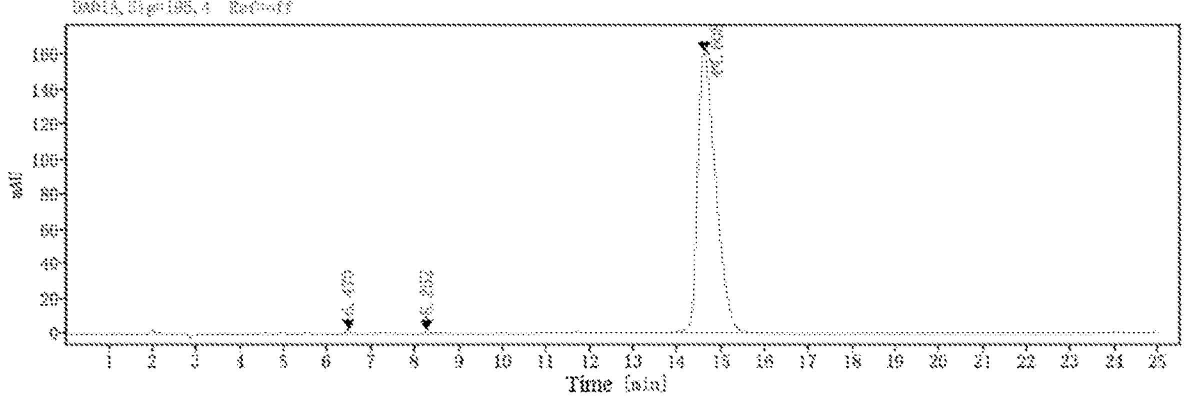
FIG. 3 is the HPLC spectrogram of 4-(hydroxymethylphosphinyl)-2-oxobutanoic acid standard sample.

In addition: see FIG. 3 for the HPLC spectrogram of the 4-(hydroxymethylphosphinyl)-2-oxobutanoic acid standard sample.

Example 2

(1) 130 g of 98% 3-chloropropionyl chloride, 300 mL of acetonitrile, 1.0 g of 96% trimethylsilyl cyanide and 50.0 g of 98% sodium cyanide were added into a 1000 mL four-neck flask. The mixture was heated up to 70-80 °C, and maintained at this temperature for 5 h of reaction. Then the mixture was cooled down to obtain a material solution containing 4-chloro-2-oxobutyronitrile. The solution was distilled under reduced pressure at a temperature controlled at 80-90 °C, and separated to obtain 99.4 g of 97% 4-chloro-2-oxobutyronitrile with a yield of 82%.

(2) The 4-chloro-2-oxobutyronitrile obtained in step (1) and 110 g of 98% dimethyl methylphosphonite were added into 500 mL of 1,2-dichloroethane, and added with 7.9 g of cuprous iodide as a catalyst. The mixture was stirred at 80-90 °C for 8 hours of reaction to obtain a material solution of methyl (3-cyano-3-oxopropyl)methyl phosphinate. The solvent, by-products and unreacted raw materials were removed under reduced pressure to obtain crude methyl (3-cyano-3-oxopropyl)methyl phosphinate.

(3) The crude methyl (3-cyano-3-oxopropyl)methyl phosphinate obtained in step (2) was added into a 1000 mL four-necked flask filled with 500 g of 20% hydrochloric acid. The mixture was heated to 80-90 °C to perform hydrolysis reaction. After 10 h, the acid water was removed under reduced pressure to obtain a mixture containing 4-(hydroxymethylphosphinyl)-2-oxobutanoic acid and inorganic salts, which was added with 300 mL of acetone for dissolution. The mixture was filtered to remove insoluble salts, and the filtrate was concentrated under reduced pressure to half the volume. 500 mL of methyl isobutyl ketone was added for crystallization to obtain 104.2 g of 4-(hydroxymethylphosphinyl)-2-oxobutanoic acid with a purity of 95% and a yield of 67%.

Example 3

(1) 130 g of 98% 3-chloropropionyl chloride, 300 mL of toluene, 5.2 g of 96% trimethylsilyl cyanide and 60.0 g of 98% sodium cyanide were added into a 1000 mL four-neck flask. The mixture was heated up to 100-110 °C, and maintained at this temperature for 3 h of reaction. Then the mixture was cooled down to obtain a material solution containing 4-chloro-2-oxobutyronitrile. The solution was distilled under reduced pressure at a temperature controlled at 90-100 °C, and separated to obtain 91.5 g of 95% 4-chloro-2-oxobutyronitrile with a yield of 74%.

(2) The 4-chloro-2-oxobutyronitrile obtained in step (1) and 132 g of 98% dipropyl methylphosphonite were added into 500 mL of 1,2-dichloroethane, and added with 3.4 g of cuprous iodide as a catalyst. The mixture was stirred at 80-90 °C for 8 hours of reaction to obtain a material solution of propyl (3-cyano-3-oxopropyl)methyl phosphinate. The solvent, by-products and unreacted raw materials were removed under reduced pressure to obtain crude propyl (3-cyano-3-oxopropyl)methyl phosphinate.

(3) The crude propyl (3-cyano-3-oxopropyl)methyl phosphinate obtained in step (2) was added into a 1000 mL four-necked flask filled with 405 g of 30% hydrochloric acid. The mixture was heated to 100-110 °C to perform hydrolysis reaction. After 3 h, the acid water was removed under reduced pressure to obtain a mixture containing 4-(hydroxymethylphosphinyl)-2-oxobutanoic acid and inorganic salts, which was added with 300 mL of acetone for dissolution. The mixture was filtered to remove insoluble salts, and the filtrate was concentrated under reduced pressure to half the volume. 500 mL of methyl isobutyl ketone was added for crystallization to obtain 87.5 g of 4-(hydroxymethylphosphinyl)-2-oxobutanoic acid with a purity of 96% and a yield of 63%.

Example 4

This example was performed according to the preparation method provided in Example 1 except that in step (1), trimethylsilyl cyanide was not added as a catalyst in the substitution reaction, and in step (2), diethyl methylphosphonite was directly used as a solvent in the Arbuzov reaction (without adding 1,2-dichloroethane), and the reaction was conducted at a temperature of 110-120 °C Other steps were the same as in Example 1. 71.0 g of 96% 4-chloro-2-oxobutyronitrile was obtained with a yield of 57%. 77.8 g of the product 4-(hydroxymethylphosphinyl)-2-oxobutanoic acid was obtained with a purity of 95% and a yield of 72%.

Example 5

This example was performed according to the preparation method provided in Example 1 except that in step (1), potassium cyanide was used as a raw material for the substitution reaction (replacing sodium cyanide), and in step (2), the catalyst cuprous iodide was not added in the Arbuzov reaction. Other steps were the same as in the Example 1. 67.9 g of 97% 4-chloro-2-oxobutyronitrile was obtained with a yield of 56%. 56.3 g of the product 4-(hydroxymethylphosphinyl)-2-oxobutanoic acid was obtained with a purity of 95% and a yield of 53%.

Example 6

This example was performed according to the preparation method provided in Example 1 except that in step (1), cuprous cyanide was used as a raw material in the substitution reaction (replacing sodium cyanide), and in step (2), the solvent for the Arbuzov reaction was 2-methyltetrahydrofuran (replacing 1,2-ethylene dichloride). Other steps were the same as in the Example 1. 106.6 g of 97% 4-chloro-2-oxobutyronitrile was obtained with a yield of 88%. 102.4 g of the product 4-(hydroxymethylphosphinyl)-2-oxobutanoic acid was obtained with a purity of 96% and a yield of 62%.

The above are only preferred embodiments of the present invention. It should be noted that, for those of ordinary skill in the art, without departing from the principle of the present invention, several improvements and modifications can also be made, and these improvements and modifications should also be regarded as the protection scope of the present invention.

The invention claimed is:

1. A method for preparing 4-(hydroxymethylphosphinyl)-2-oxobutanoic acid, comprising the following steps:

a) mixing 3-chloropropionyl chloride, a first solvent, trimethylsilyl cyanide and cyanide salt, performing a substitution reaction to obtain a material solution containing 4-chloro-2-oxobutyronitrile, then performing distillation under reduced pressure, and performing separation to obtain 4-chloro-2-oxobutyronitrile intermediate;

b) subjecting the 4-chloro-2-oxobutyronitrile intermediate obtained in step a) and methyl phosphonite diester to Arbuzov reaction in a second solvent in the presence of cuprous iodide to obtain a material solution of (3-cyano-3-oxopropyl)methyl phosphinate, and performing purification to obtain crude (3-cyano-3-oxopropyl)methyl phosphinate;

c) mixing the crude (3-cyano-3-oxopropyl)methyl phosphinate obtained in step b) with hydrochloric acid, performing hydrolysis reaction, and then performing purification treatment to obtain 4-(hydroxymethylphosphinyl)-2-oxobutanoic acid.

2. The method according to claim 1, wherein in step a), the first solvent is selected from the group consisting of acetonitrile, toluene, 2-methyltetrahydrofuran, phenylacetonitrile and a combination thereof;

the cyanide salt is selected from the group consisting of sodium cyanide, potassium cyanide, cuprous cyanide and a combination thereof;

the trimethylsilyl cyanide, cyanide salt and 3-chloropropionyl chloride are in a molar ratio of (0.005-0.2):(0.8-3):1.

3. The method according to claim 1, wherein in step a), the substitution reaction is performed at a temperature of 0 °C-150 °C for 0.5 h-48 h.

4. The method according to claim 1, wherein in step b), the methyl phosphonite diester is selected from the group consisting of dimethyl methylphosphonite, diethyl methylphosphonite, dipropyl methylphosphonite, dibutyl methylphosphonite, and a combination thereof;

the methylphosphonite diester and the 4-chloro-2-oxobutyronitrile intermediate are in a molar ratio of (0.8-10):1.

5. The method according to claim 1, wherein in step b), the cuprous iodide and 4-chloro-2-oxobutyronitrile intermediate are in a molar ratio of (0.005-0.2):1.

6. The method according to claim 1, wherein in step b), the second solvent is selected from the group consisting of 1,2-dichloroethane, 2-methyltetrahydrofuran, benzene, toluene, xylene and a combination thereof;

the second solvent and the 4-chloro-2-oxobutyronitrile intermediate are in a mass ratio of (1-10):1.

7. The method according to claim 1, wherein in step b), the Arbuzov reaction is conducted at a temperature of 50 °C-150 °C for 1 h to 24 h.

8. The method according to claim 1, wherein in step c), the hydrochloric acid has a mass concentration of 20%-36%;

the hydrochloric acid and the 4-chloro-2-oxobutyronitrile intermediate in step b) are in a molar ratio of (1-15):1.

9. The method according to claim 1, wherein in step c), the hydrolysis reaction is conducted at a temperature of 50 °C-130 °C for 1 h-24 h.

10. The method according to claim 1, wherein in step c), the process of the purification treatment is specifically conducted by:

removing acid water from the product obtained by the hydrolysis reaction under reduced pressure to obtain a mixture containing 4-(hydroxymethylphosphinyl)-2-oxobutanoic acid and inorganic salts, then adding acetone for dissolution, performing filtration to remove insoluble salts, concentrating the filtrate under reduced pressure to half of the volume, and adding methyl isobutyl ketone for crystallization to obtain the product 4-(hydroxymethylphosphinyl)-2-oxobutanoic acid.

* * * * *